United States Patent [19]
Bartoldus et al.

[11] Patent Number: 5,833,266
[45] Date of Patent: Nov. 10, 1998

[54] VEHICLE OCCUPANT RESTRAINT ASSEMBLY

[75] Inventors: Daniel Edward Bartoldus, Newport News, Va.; Edward James Burley, Brandon, Fla.

[73] Assignee: Breed Automotive Technology, Inc., Lakeland, Fla.

[21] Appl. No.: 865,754

[22] Filed: May 30, 1997

[51] Int. Cl.⁶ .................................................. B60R 21/26
[52] U.S. Cl. .................................. 280/743.1; 280/728.2; 280/730.2
[58] Field of Search .................... 280/743.1, 730.2, 280/728.1, 728.2

[56] References Cited

U.S. PATENT DOCUMENTS

| | | | |
|---|---|---|---|
| 4,153,273 | 5/1979 | Risko | 280/740 |
| 5,100,168 | 3/1992 | Horiuchi et al. | 280/728.1 |
| 5,332,259 | 7/1994 | Conlee et al. | 280/743.1 |
| 5,445,407 | 8/1995 | Lotspih | 280/728.2 |
| 5,487,556 | 1/1996 | Jenkins et al. | 280/728.2 |
| 5,566,972 | 10/1996 | Yoshida et al. | 280/743.1 |
| 5,605,347 | 2/1997 | Karlow et al. | 280/728.2 |
| 5,667,241 | 9/1997 | Bunker et al. | 280/730.2 |

*Primary Examiner*—Eric D. Culbreth
*Attorney, Agent, or Firm*—Lonnie Drayer

[57] ABSTRACT

A vehicle occupant restraint assembly has an airbag having a gas retaining portion with first and second openings and an inflator having first and second ends positioned within the airbag. The first end of the inflator is extended through the first opening and a first hole in the first outer flap of the airbag. Similarly, the second end of the inflator is extended through the second opening and a second hole in a second outer flap. To construct a vehicle occupant restraint assembly, first and second openings are sewn into the gas retaining portion of an airbag. An inflator is placed into the airbag through the second opening. The first end of the airbag is extended through the first opening.

12 Claims, 5 Drawing Sheets

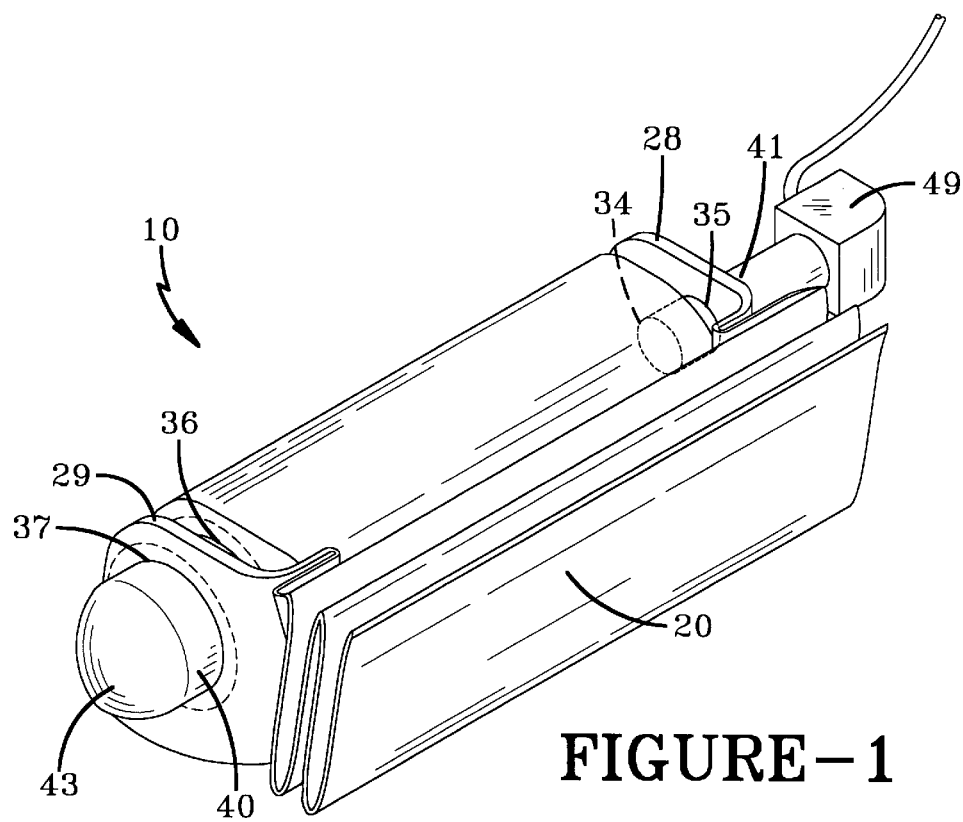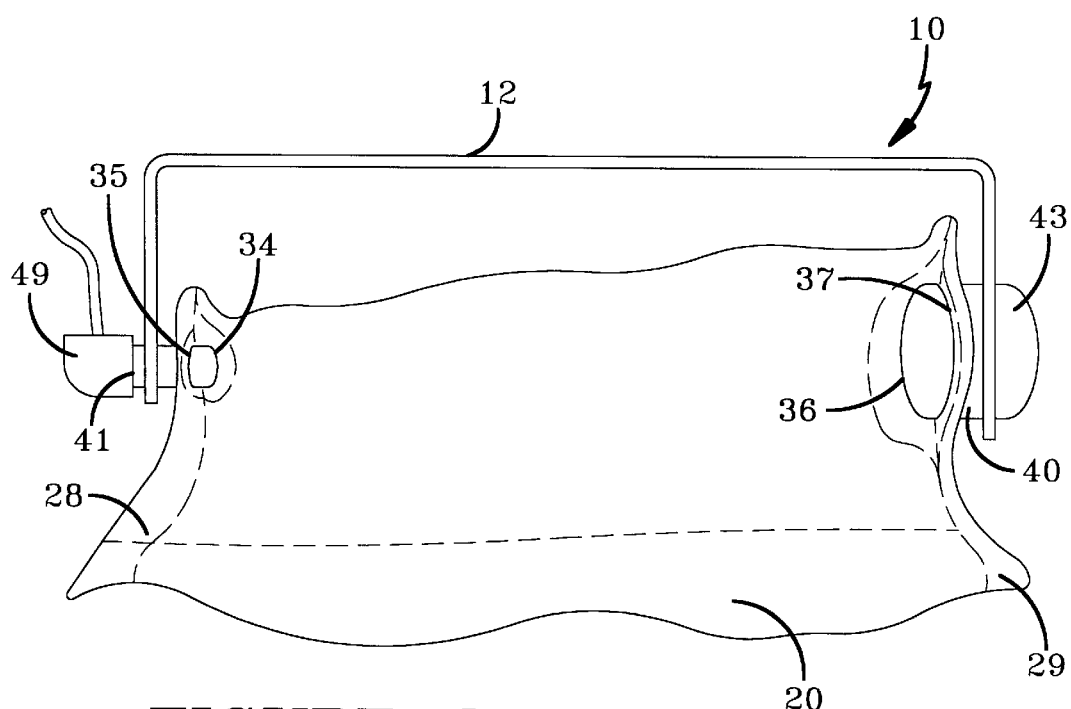

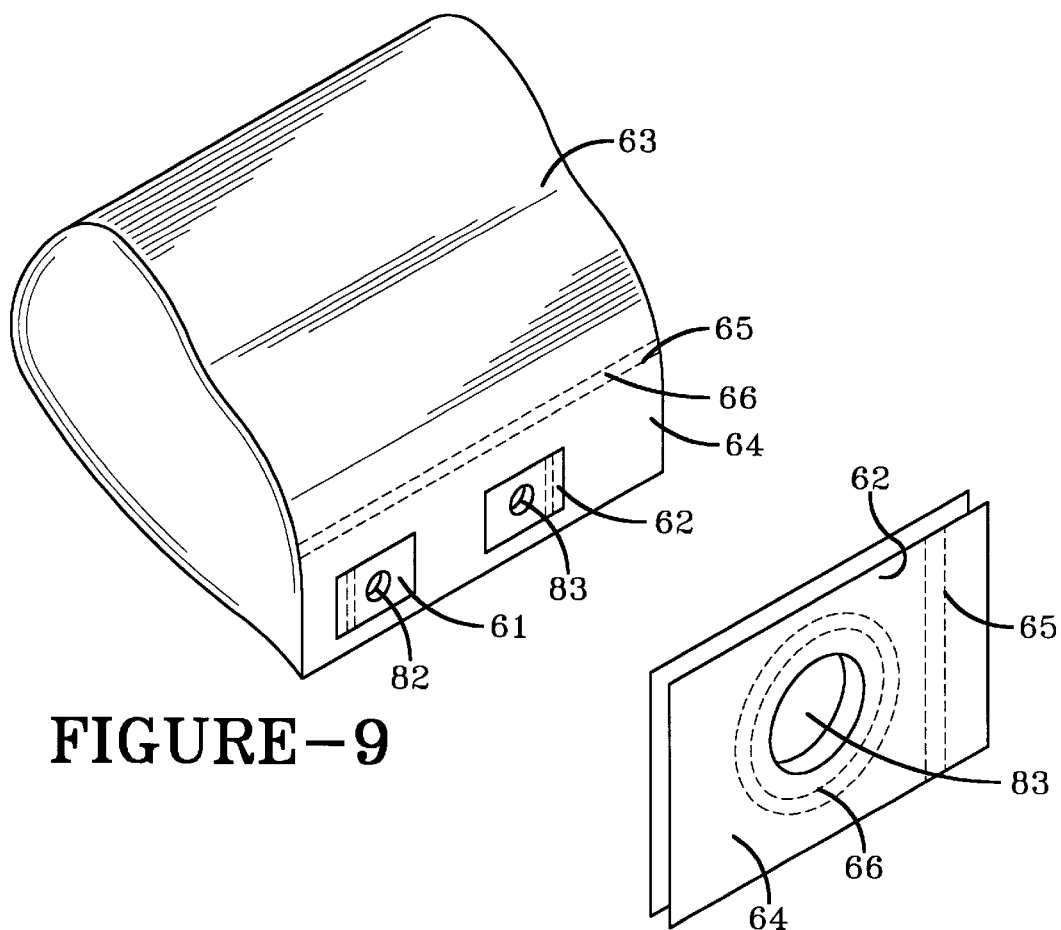
FIGURE-9
FIGURE-10
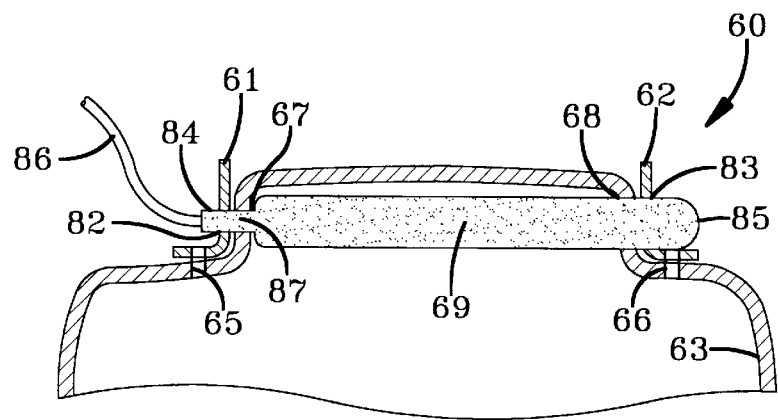
FIGURE-11

VEHICLE OCCUPANT RESTRAINT ASSEMBLY

BACKGROUND OF THE INVENTION

This invention pertains generally to vehicle occupant restraints, such as airbags, and more specifically to methods and apparatuses for assembling an inflator with an airbag.

DESCRIPTION OF THE RELATED ART

It is well known to provide occupant restraint assemblies for vehicles such as passenger cars to restrain a vehicle occupant during a crash. Occupant restraint assemblies typically include an airbag, an inflator and a retainer or module housing used to attach the airbag to the inflator. Commonly, the airbag is mounted to a module housing while the inflator is positioned within the module housing. When a vehicle collision is sensed, the inflator inflates the airbag with a gas, restraining the associated vehicle occupant.

A common problem in the art is the need to reduce the weight of the occupant restraint assembly. Another problem in the art is the number of components required in occupant restraint assemblies. It is believed that all known occupant restraint assemblies require a module housing or a retainer. Such a retainer is disclosed, for example, in U.S. Pat. No. 5,605,347. The difficulties inherent in the prior art are overcome by the present invention in a way that is simple and efficient while providing advantageous results.

SUMMARY OF THE INVENTION

In accordance with one aspect of the invention there is provided a vehicle occupant restraint assembly for restraining a vehicle occupant during a vehicle crash. The occupant restraint assembly includes an airbag having a gas retaining portion with first and second holes therethrough. The occupant restraint assembly also has an inflator positioned within the airbag. A first end of the inflator extends through the first hole in the airbag and a second end of the inflator extends through the second hole in the airbag.

In accordance with still another aspect of the invention, there is provided a method for constructing an occupant restraint assembly. First and second holes are formed in the gas retaining portion of an airbag. An inflator is placed into the airbag through one of the holes.

One advantage of the present invention is that the total weight of the vehicle occupant restraint assembly is reduced.

Another advantage of the present invention is that the number of components of the vehicle occupant restraint assembly is reduced, thereby reducing cost.

Another advantage of the present invention is that the vehicle occupant restraint assembly is easily and quickly assembled.

Another advantage of the present invention is that the inflator is positioned within the airbag while the electrical connection is located outside the airbag.

Another advantage of the present invention is that the airbag can be folded before the inflator is passed into it.

Still another advantage of the present invention is that the inflator length can vary without changing the airbag design.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 1 is a perspective view of a vehicle occupant restraint assembly of the present invention showing the airbag in a folded condition.

FIG. 2 is a fragmentary front view of the vehicle occupant restraint assembly of FIG. 1.

FIG. 9 is a perspective view of an unfolded airbag according to another embodiment of the present invention.

FIG. 10 is a close up view of the first outer flap of FIG. 9.

FIG. 11 is a sectional top view of the embodiment shown in FIG. 9.

DESCRIPTION OF THE PREFERRED EMBODIMENT

Figure 3:
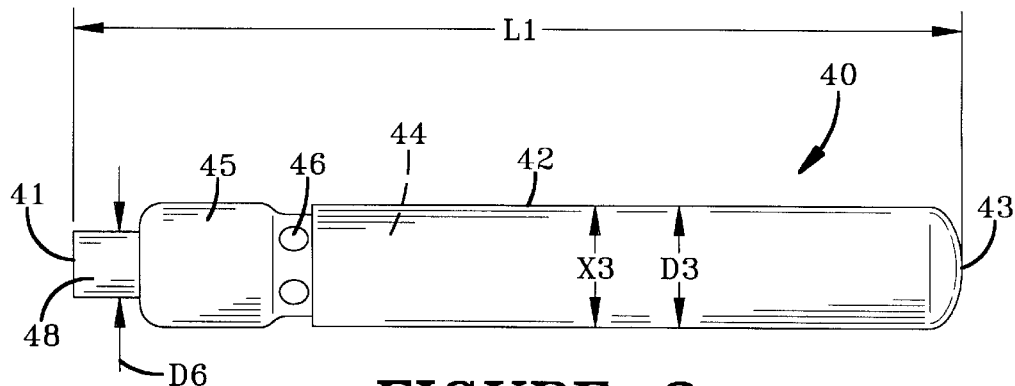
FIG. 3 is a front view of a hybrid inflator.

Referring now to the drawings wherein the showings are for purposes of illustrating a preferred embodiment of the invention only and not for purposes of limiting the same, FIGS. 1 and 2 show a vehicle occupant restraint assembly 10 for use with an associated vehicle. The embodiment illustrated is intended for use in vehicles designed with side mounted side impact airbags and the invention is applicable to airbags used for driver side, passenger side, and other applications as well. The vehicle occupant restraint assembly includes an airbag 20 and an inflator 40. In FIG. 1 the airbag 20 is shown in a folded configuration as when the airbag is being installed into an associated vehicle (not shown). In FIG. 2 a fragmentary view of the airbag 20 is shown in an unfolded, uninflated configuration showing how the inflator extends through the inner and outer holes in the airbag.

Figure 4:
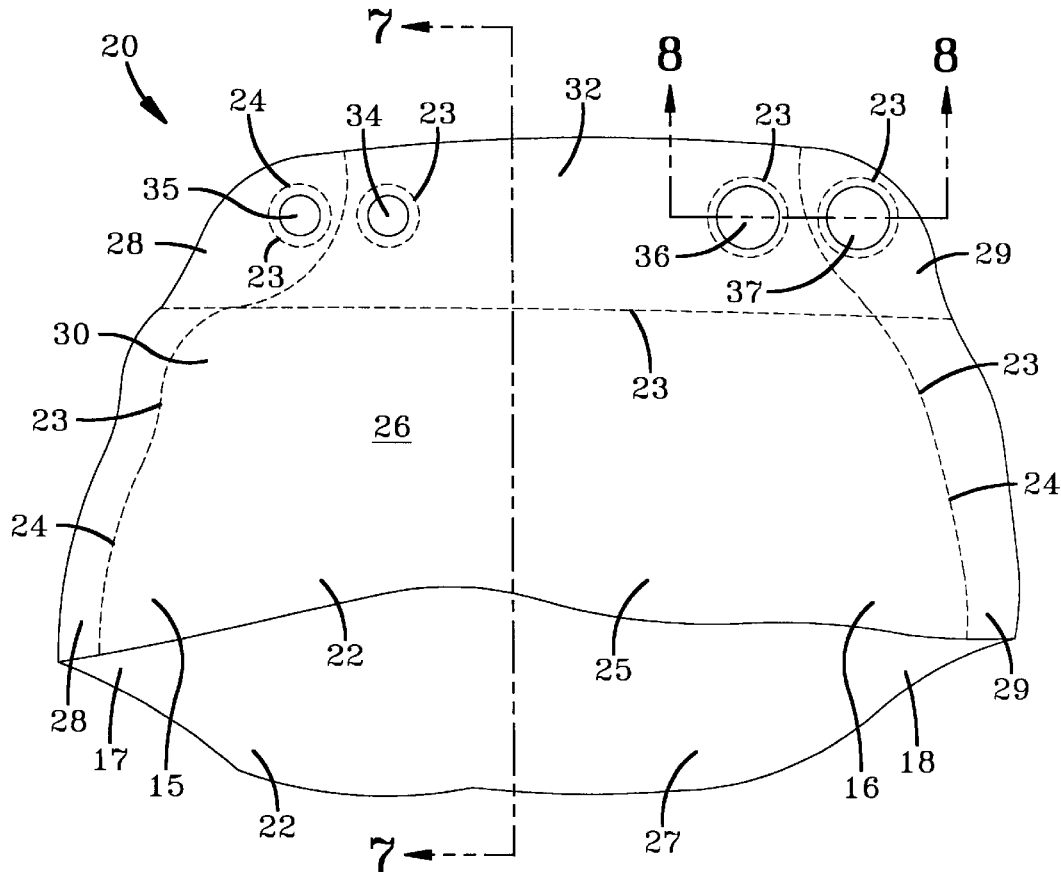
FIG. 4 is a perspective cut-a-way view of the airbag.
Figure 8:
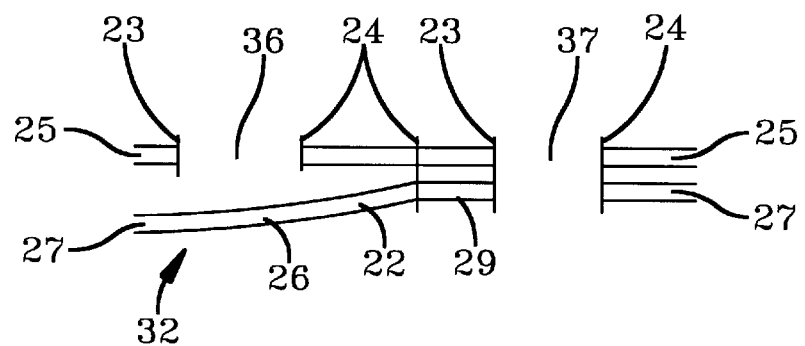
FIG. 8 is a sectional view taken along line 8—8 of FIG. 4.

FIG. 8 is a sectional view taken along line 8—8 of FIG. 4 showing that the airbag has first and second walls and showing that the inner holes go through only the first wall while the outer holes go through both the first and second walls. With reference to FIGS. 1–4 and 8, the airbag 20 has first and second walls 25, 27. As shown in FIG. 4, the first wall 25 has first and second ends 15, 16 and the second wall 27 has first and second ends 17, 18. The airbag has first and second inner holes 34, 36 that go through only the first wall 25 of the airbag. The airbag has first and second outer holes 35, 37 that go through both the first and second walls 25, 27 of the airbag. It should be noted that in this preferred embodiment, the inflator 40 is positioned within the airbag. The inflator 40 has a first end 41 that extends through the first inner hole 34 and the first outer hole 35 in the airbag. The inflator 40 also has a second end 43 that extends through the second inner hole 36 and the second outer hole 37 in the airbag. In this way the inflator 40 retains the airbag 20 without any additional components required. An associated inflator retention device 12 can be used to retain the inflator and to mount it to a mounting surface of a vehicle (not shown). It should be noted that any type of inflator retention device chosen with sound engineering judgment could be used with the vehicle occupant restraint assembly 10 of this invention.

Figure 7:
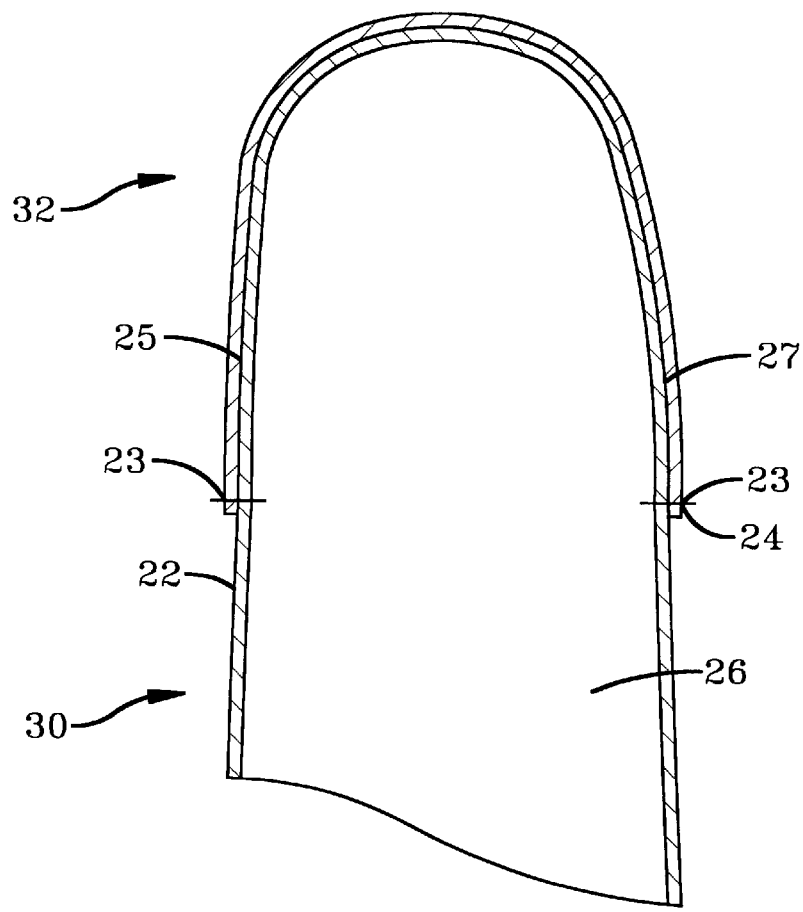
FIG. 7 is a sectional view taken along line 7—7 of FIG. 4.

With reference now to FIGS. 4, 7 and 8, the airbag 20 is made of a sheet material 22 that is preferably sewable nylon but other materials chosen with sound engineering judgement could also be used. This invention is applicable to sheet material that is woven, knitted or a film. It is well known in the art to coat the airbag material with a substance such as silicone to help reduce gas leakage. This invention is applicable for both coated and un-coated airbag materials. The sheet material 22 is sewn together with any thread 24 chosen according to sound engineering judgement, such as nylon thread, thereby forming seams 23. In particular, as shown in FIG. 4, the first end 15 of the first wall 25 is fixedly connected to the first end 17 of the second wall 27 and the second end 16 of the first wall 25 is fixedly connected to the second end 18 of the second wall 27.

Figure 5:
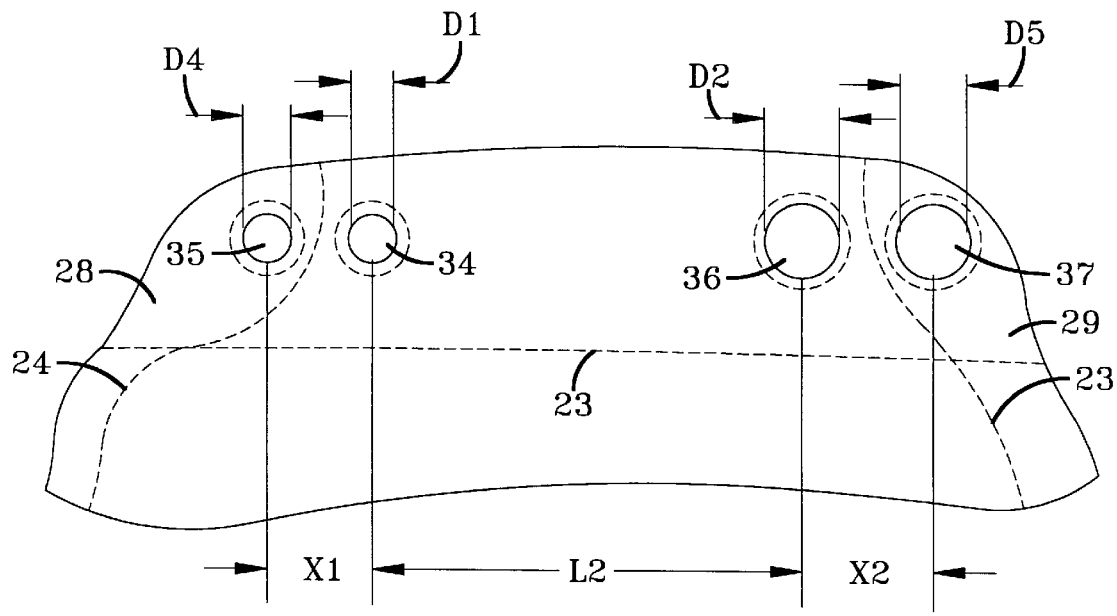
FIG. 5 is an enlarged fragmentary view of the top of the airbag shown in FIG. 2.
Figure 6:
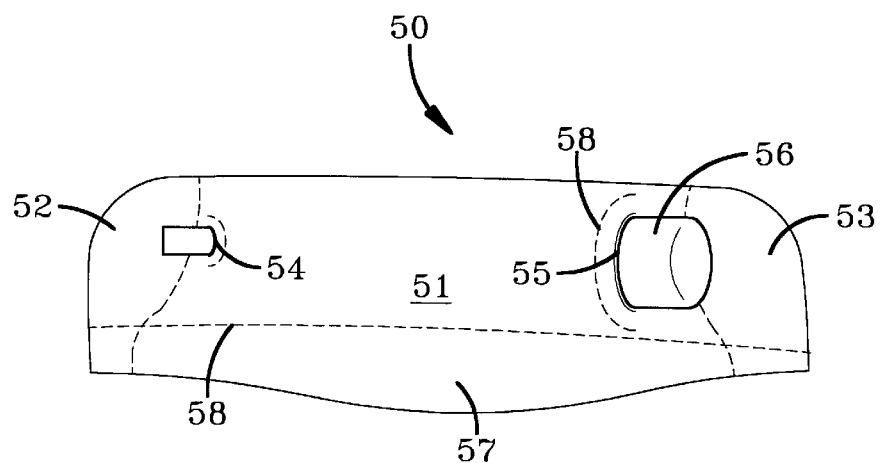
FIG. 6 is a fragmentary view of another embodiment of the present invention.

With reference to FIGS. 2, and 4–11, the seams 23 in FIGS. 2, 4–5 and 7–8 as well as the seams 58 in FIG. 6 are shown as single seams. By single seams it is meant that only one line of thread 24 is used to form the seam. This is done to simplify the figures. Though the use of single seams is possible with this invention, preferably, the seams are double seams, i.e., have two lines of thread. The seams 66 in FIGS. 9–11 are shown as double seams.

With reference now to FIGS. 4 and 7, the airbag 20 has a gas retaining portion 26 that is bordered by first and second outer flaps 28, 29 that extend outwardly from the gas retaining portion 26. The gas retaining portion of the airbag is used to contain pressurized gas when the airbag is inflated. The gas retaining portion 26, as best seen in FIG. 7, preferably has a single layer segment 30 and a double layer segment 32. The single layer segment comprises one layer of sewable material and the double layer segment 32 comprises two layers of sewable material. The single and double layer segments 30, 32 are sewn together using seams 23 constructed with the thread 24.

With reference now to FIGS. 4 and 8, the gas retaining portion 26 of the airbag 20 has first and second inner holes 34, 36 therein that have peripheries reinforced by seams 23 and are preferably located within the double layer segment 32. It should be noted, as best seen in FIG. 8, that the second inner hole 36 extends through the first wall 25 of the airbag but not the second wall 27 of the airbag. The first inner hole 34 is similarly located in only the first wall 25 of the airbag. Preferably, the first outer flap 28 has a first outer hole 35 therethrough and the second outer flap 29 has a second outer hole 37 therethrough. The peripheries of both the first and second outer holes 35, 37 are reinforced by seams 23 that go through both the first and second walls 25, 27 of the airbag. The second outer hole 37 is shown in FIG. 9. Thus, the first and second inner holes 34, 36 are located in the gas retaining portion 26 of the airbag while the first and second outer holes 35, 37 are located in the first and second outer flaps 28, 29 respectively, of the airbag.

With reference now to FIG. 3, the inflator 40 has first and second ends 41, 43. In this embodiment the inflator is of a type known in the art as a hybrid inflator, but other types of inflators could also be used in this invention. A hybrid inflator is one that combines the use of a gas-generating material and a quantity of stored pressurized gas to inflate the airbag. The inflator 40 has a pressure vessel 42 that contains a suitable pressurized gas 44 and a diffuser housing 45 with openings 46 that allow both the generated gas and the pressurized gas to exit the inflator and enter the airbag 20. The inflator also has an igniter assembly 48 that is used to operate the hybrid inflator. The igniter assembly 48 is connectable to electrical contact means 49 that connects the igniter assembly 48 to a crash sensor (not shown) or a controller (not shown). The crash sensor can be of any type presently used in the art to sense a collision or sudden deceleration of the vehicle.

With reference now to FIGS. 3 and 5, the first and second inner holes 34, 36 in the airbag 20 are preferably circular with diameters D1 and D2 respectively. The first and second outer holes 35, 37 are also preferably circular with diameters D4 and D5 respectively. The inflator 40 has a length L1 and a maximum cross-section dimension X3. Preferably the inflator has a circular cross-section and thus in this preferred embodiment the maximum cross-section dimension X3 is the diameter D3 of the pressure vessel 42. The inflator 40 is passed into the airbag 20 through the second inner hole 36 during the installation or manufacturing process. Preferably the entire inflator is non-passable through the first inner hole 34. By non-passable it is meant that a force larger than a manually generated force would be required to pass the entire inflator through the first inner hole 34. Such a large force would likely rip the sheet material 22 around the first inner hole 34 and is undesirable. Of course, the force used to pass the entire inflator through the second inner hole 36 does not have to be manually generated but it should not require a magnitude greater than a manually generated force. Therefore the inflator 40, at its maximum cross-section dimension X3, which is preferably diameter D3, can selectively pass through the second inner hole 36 but is non-passable through the first inner hole 34. The first end 41 of the inflator, however, has a diameter D6 and is able to be passed through the first inner hole 34 so that the first end of the inflator can extend through the first inner hole.

With continuing reference to FIGS. 3 and 5, the centers of the first and second inner holes 34, 36 are spaced apart a distance L2. Also, as noted above, the first end 41 of the inflator extends through the first inner hole 34 and the first outer hole 35 while the second end 43 of the inflator 40 extends through the second inner hole 36 and the second outer hole 37. Therefore the size of the inflator i.e., the diameters D3, D6 and the length L1, determine the appropriate sizes for the diameters D1, D2, D4 and D5, of the first and second inner holes and the first and second outer holes as well as the distance L2 between the first and second inner holes 34, 36. Although these sizes can be any chosen with sound engineering judgment, distance L2 is preferably within the range of 7.0 cm, smaller than length L1 (length L1–7.0 cm) to 7.0 cm longer than length L1 (length L1+7.0 cm). Thus it can be appreciated that length L1 of the inflator 40 can vary somewhat without changing the design of the airbag.

With reference now to FIGS. 3–5, the first and second inner holes 34, 36 through the gas retaining portion 26 of the airbag 20 and the first and second outer holes 35, 37 through the first and second outer flaps 28, 29 of the airbag preferably have sealing means. It should be noted that while this invention does not require sealing means, it is preferred because without sealing means when the inflator 40 inflates the airbag 20 with gas, the gas would leak out of the airbag through the first and second inner holes 34, 36. Thus the capacity of the inflator 40 to supply gas would have to be greater to properly inflate the airbag, increasing the cost of the inflator. The first and second outer holes 35, 37 are preferably sealed by sealing means so that they maintain their position on the first and second ends 41, 43 of the inflator 40. This prevents the first and second flaps 28, 29 from slipping off the inflator 40. The sealing means can be any chosen with sound engineering judgement but preferably is an interference fit of the sheet material 22 with the exterior of the inflator 40. To accomplish the interference fit, the diameters D1, D4 of the first inner and outer holes 34, 36 are preferably within the range of 7.0 mm smaller than the diameter D6 (diameter D6−7.0 mm) to 1.0 mm smaller than the diameter D6 (diameter D6−1.0 mm). Similarly, the diameters D2, D5 of the second inner and outer holes 36, 37 are preferably within the range of 7.0 mm smaller than diameter D3 (diameter D3−7.0 mm) to 1.0 mm smaller than diameter D3 (diameter D3−1.0 mm).

With reference to FIGS. 3 and 5, because the inflator 40 can be passed through the second inner hole 36 but not through the first inner hole 34 as discussed above, preferably the first inner hole is smaller than the second inner hole. Thus, the diameter D1 is preferably within the range of 0.2 times the diameter D2 (diameter D2×0.2) to 0.9 times the diameter D2 (diameter D2×0.9). Similarly the first outer hole 35 is preferably smaller than second outer hole 37. The diameter D4 is preferably within the range of 0.2 times the diameter D5 (diameter D5×0.2) to 0.9 times the diameter D5 (diameter D5×0.9).

With reference now to FIGS. 3–5, there is a distance X1 between the centers of the first inner hole 34 and the first outer hole 35. Likewise, there is a distance X2 between the centers of the second inner hole 36 and the second outer hole 37. The distances X1, X2 provide room for the first and second outer flaps 28, 29 to be folded and attached to the inflator 40. Preferably the distance X1 is within the range of the diameter D6 to 3.0 times the diameter D6 (diameter D6×3.0). Similarly, the distance X2 is preferably within the range of the diameter D3 to 3.0 times the diameter D3 (diameter D3×3.0).

With reference to FIGS. 1–4, the vehicle occupant restraint assembly 10 is constructed in this way. The sheet material 22 is sewn together, using thread 24 to form seams 23, into the appropriate shape for the airbag 20. The peripheries of the first and second inner holes 34, 36 as well as the peripheries of the first and second outer holes 35, 37 are reinforced with seams 23. At this point the airbag can be folded in any appropriate manner. The inflator 40 is then passed inside the airbag through the second inner hole 36. The second end 43 of inflator remains extended through the second inner hole 36. Next the first end 41 of inflator is extended through the first inner hole 34. The first outer flap 28 is then attached to the inflator by extending the first end 41 of the inflator through the first outer hole 35. Similarly, the second outer flap 29 is attached by extending the second end 43 of the inflator through the second outer hole 37. Finally, the electrical contact means 49 is attached to the igniter assembly 48 of the inflator.

In an alternative embodiment of this invention, with reference to FIG. 6, a vehicle occupant restraint assembly 50 may not require holes in its first and second outer flaps 52, 53. This embodiment is directed toward applications where airbag deployment produces relatively mild mass or speed requirements. In this case, first and second inner holes 54, 55 formed in a gas retaining portion 51 are sufficient to enable the inflator 56 to retain the airbag 57 during deployment.

In another alternative embodiment of this invention, with reference to FIGS. 9–11, a vehicle occupant restraint assembly 60 comprises an inflator 69, an airbag 63 that is made of a sheet material 64, and separately formed first and second outer flaps 61, 62 also made of the sheet material 64. Preferably, the sheet material 64 is sewable nylon. It is also preferred that the first and second outer flaps 61, 62 are formed of two layer of the sewable sheet material 64. The vehicle occupant restraint assembly 60 is constructed similarly to the vehicle occupant restraint assembly 10 disclosed above. The sheet material 64 is sewn together using thread 65 to form seams 66, into the appropriate shape for the airbag. The peripheries of first and second inner holes 67, 68 are reinforced with seams 66. Next, the first and second outer flaps 61, 62 which have first and second outer holes 82, 83 therethrough respectively, are sewn onto the airbag 63. The peripheries of the first and second outer holes 82, 83 are reinforced by seams 66. It should be noted that the first and second outer holes 82, 83 of the first and second outer flaps 61, 62 are concentrically aligned with the first and second inner holes 67, 68 of the airbag 63. The first and second outer flaps 61, 62 can be formed into an L shape as shown in FIG. 11. An inflator 69 is then passed inside the airbag 63 through the second inner hole 68. A second end 85 of the inflator 69 remains extended through the second inner hole 68. Next a first end 84 of the inflator 69 is extended through the first inner hole 67. The first outer flap 61 is then attached to the inflator 69 by extending the first end 84 of the inflator 69 through the first outer hole 82 of the first outer flap 61. Similarly, the second outer flap 62 is attached by extending the second end 85 of the inflator 69 through the second outer hole 83 of the second outer flap 62. Finally, electrical contact means 86 is attached to the igniter assembly 87 of the inflator 69.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

We claim:

1. A method of constructing a vehicle occupant restraint assembly, the vehicle occupant restraint assembly having an inflator with first and second ends, the method comprising the step of:

sewing first and second ends of a first wall to the first and second ends respectively of a second wall thereby forming an airbag with a gas retaining portion and forming an airbag with first and second outer flaps that extend outwardly from said gas retaining portion;

sewing around the periphery of a first inner hole in said first wall of said gas retaining portion of said airbag;

sewing around the periphery of a second inner hole in said first wall of said gas retaining portion of said airbag;

passing said inflator into said airbag through said second inner hole; and, extending said first end of said inflator through said first inner hole.

2. The method of claim 1 wherein, after the step of sewing around the periphery of a second inner hole in said first wall of said gas retaining portion of said airbag, the method comprises the step of folding said airbag.

3. The method of claim 1 wherein said first outer flap has a first outer hole sewn therein and, after the step of extending said first end of said inflator through said first inner hole, the method comprises the step of extending said first end of said inflator through said first outer hole of said first outer flap.

4. The method of claim 1 wherein, after the step of extending said first end of said inflator through said first inner hole, the method further comprises the step of attaching electrical contact means to the inflator.

5. A vehicle occupant restraint assembly comprising:

an airbag formed of first and second walls, said first and second walls forming a gas retaining portion for use in containing pressurized gas, said first and second walls also forming first and second outer flaps that extend outwardly from said gas retaining portion, said first wall having first and second inner holes therethrough in said gas retaining portion of said airbag; and, an inflator for inflating said airbag, said inflator having first and second ends, said inflator being positioned within said airbag, said first end extending through said first inner hole and said second end extending through said second inner hole.

6. The vehicle occupant restraint assembly of claim 5 wherein said first outer flap has a first outer hole therethrough, said first end of said inflator extending through said first outer hole.

7. The vehicle occupant restraint assembly of claim 6 wherein said second outer flap has a second outer hole therethrough, said second end of said inflator extending through said second outer hole.

8. The vehicle occupant restraint assembly of claim 7 wherein said first end of said inflator is substantially circular in cross section with a diameter D6 and said second end of said inflator is substantially circular in cross section with a diameter D3, said first outer hole being substantially circular with a diameter D4 and said second outer hole being substantially circular with a diameter D5, the vehicle occupant restraint assembly further comprising first outer hole sealing means for sealing said first outer hole of said first outer flap and second outer hole sealing means for sealing said second outer hole of said second outer flap, said first end of said inflator extending through said first outer hole sealing means and said second end of said inflator extending through said second outer hole sealing means, said first outer hole sealing means comprising an interference fit and said second outer hole sealing means comprising an interference fit, said diameter D4 being within the range of (diameter D6−7.0 mm) to (diameter D6−1.0 mm) and said diameter D5 being within the range of (diameter D3−7.0 mm) to (diameter D3−1.0 mm).

9. The vehicle occupant restraint assembly of claim 7 wherein said second end of said inflator is substantially circular in cross section with a diameter D3, said second outer hole having a center located a distance X2 from the center of said second inner hole, said distance X2 being in the range of (diameter D3) to (diameter D3×3.0).

10. The vehicle occupant restraint assembly of claim 7 wherein said first and second outer holes are substantially circular having diameters D4 and D5 respectively, said diameter D4 being within the range of (diameter D5×0.2) to (diameter D5×0.9).

11. The vehicle occupant restraint assembly of claim 6 wherein said first end of said inflator is substantially circular in cross section with a diameter D6, said first outer hole having a center located a distance X1 from the center of said first inner hole, said distance X1 being in the range of (diameter D6) to (diameter D6×3.0).

12. The vehicle occupant restraint assembly of claim 6 wherein said first and second outer holes go through both said first and second walls.

* * * * *